(12) United States Patent
Dixon et al.

(10) Patent No.: US 11,485,633 B2
(45) Date of Patent: Nov. 1, 2022

(54) PHASE-CHANGING BORANE CONTAINING FUEL

(71) Applicants: THE BOARD OF TRUSTEES OF THE UNIVERSITY OF ALABAMA, Tuscaloosa, AL (US); The Sentient Corporation, Harvest, AL (US)

(72) Inventors: David A. Dixon, Tuscaloosa, AL (US); Alice DeSimone, Tuscaloosa, AL (US); Matthew Confer, Tuscaloosa, AL (US); Hope Burnham, Germantown, WI (US); Shane Street, Hoover, AL (US); Kent Key, Harvest, AL (US)

(73) Assignees: The Board of Trustees of The University of Alabama, Tuscaloosa, AL (US); The Sentient Corporation, Harvest, AL (US)

( * ) Notice: Subject to any disclaimer, the term of this patent is extended or adjusted under 35 U.S.C. 154(b) by 516 days.

(21) Appl. No.: 16/377,737

(22) Filed: Apr. 8, 2019

(65) Prior Publication Data

US 2020/0024138 A1    Jan. 23, 2020

Related U.S. Application Data

(60) Provisional application No. 62/682,448, filed on Jun. 8, 2018.

(51) Int. Cl.
*C01B 3/04* (2006.01)
*C06B 27/00* (2006.01)

(52) U.S. Cl.
CPC .............. *C01B 3/047* (2013.01); *C06B 27/00* (2013.01); *C01B 2203/02* (2013.01)

(58) Field of Classification Search
CPC ....... C01B 3/065; C01B 3/0084; C01B 3/047; C01B 2203/02; C01B 3/06; B01J 7/02;
(Continued)

(56) References Cited

U.S. PATENT DOCUMENTS

| 4,197,081 A | 4/1980 | Osborg |
|---|---|---|
| 4,201,553 A | 5/1980 | Osborg |

(Continued)

OTHER PUBLICATIONS

International Search Report and Written Opinion issued in corresponding application No. PCT/US2019/26271, dated Sep. 16, 2019, 8 pages.

(Continued)

*Primary Examiner* — Steven J Bos
*Assistant Examiner* — Syed T Iqbal
(74) *Attorney, Agent, or Firm* — Meunier Carlin & Curfman LLC

(57) ABSTRACT

Phase-changing fuel compositions which can generate hydrogen are provided herein. The compositions can comprise a hydrogen carrier at least partially dissolved in a polar organic solvent. The hydrogen carrier includes ammonia borane and an alkylamine borane such as methylamine borane or methylenediamine bisborane. The hydrogen carrier act as the primary fuel source in the compositions and can be present in an amount of at least 60% by weight, based on the weight of the hydrogen generation composition. The hydrogen generation compositions are a liquid at temperatures of 5° C. or greater or 25° C. or greater. Methods for the production of hydrogen from the hydrogen generation compositions are further disclosed.

24 Claims, 1 Drawing Sheet

(58) Field of Classification Search
CPC ... B01J 21/18; B01J 23/42; B01J 31/06; B01J 2231/005; B01J 2531/005; H01M 8/065; H01M 8/1018; H01M 2008/1095; H01M 2300/0082; H01M 8/04208; Y02E 60/32; Y02E 60/36; Y02E 60/50; C06B 27/00

See application file for complete search history.

(56) References Cited

U.S. PATENT DOCUMENTS

| | | | |
|---|---|---|---|
| 7,901,491 | B2 | 3/2011 | Zhao et al. |
| 8,685,364 | B2 | 4/2014 | Davis et al. |
| 2011/0008693 | A1 | 1/2011 | Yang et al. |
| 2011/0070152 | A1 | 5/2011 | Abdur-Rashid et al. |
| 2011/0104046 | A1 | 5/2011 | Abdur-Rashid et al. |
| 2013/0089493 | A1* | 4/2013 | Shin ............ H01M 8/065 423/648.1 |
| 2013/0216924 | A1* | 8/2013 | Hillhouse ............ H01M 14/00 429/408 |
| 2013/0225863 | A1* | 8/2013 | Ramachandran ......... C07F 5/00 564/9 |
| 2014/0373984 | A1 | 12/2014 | McCrary et al. |
| 2017/0232413 | A1 | 8/2017 | Sankir et al. |

OTHER PUBLICATIONS

Ahluwalia, R. K.; Peng, I. K.; Hua, T. Q., Hydrogen release from ammonia borane dissolved in an ionic liquid. Int. J. Hydrog. Energy 2011, 36, 15689-15697.

Baumann, J.; Baitalow, F.; Wolf, G., Thermal decomposition of polymeric aminoborane (H2 BNH2)x under hydrogen release. Thermochim. Acta 2005, 430, 9-14.

Bluhm. M. E.; Bradley, M. G.; Butterick, R.; Kusari, U.; Sneddon, L. G., Atnineborane-Based Chemical Hydrogen Storage: Enhanced Ammonia Borane Dehydrogenation in Ionic Liquids. J. Am. Chem. Soc. 2006, 128, 7748-7749.

Chen, G. Z.; Desinan, S.; Rosei, R.; Rosei, F.; Ma, D. L., Synthesis of Ni—Ru Alloy Nanoparticles and Their High Catalytic Activity in Dehydrogenation of Ammonia Borane. Chem.-Eur. J. 2012, 18, 7925-7930.

Dai, H. B.; Gao, L. L.; Liang, Y.; Kang, X. D.; Wang, P., Promoted hydrogen generation from ammonia borane aqueous solution using cobalt-molybdenum-boron/nickel foam catalyst. J. Power Sources 2010, 195, 307-312.

Erdogan, H.; Metin, O.; Ozkar, S., In situ-generated PVP-stabilized palladium(0) nanocluster catalyst in hydrogen generation from the methanolysis of ammonia-borane. Phys. Chem. Chem. Phys. 2009, 11, 10519-10525.

Frueh, S.; Kellett, R.; Mallery, C.; Molter, T.; Willis, W. S.; King'ondu, C.; Suib, S. L., Pyrolytic Decomposition of Ammonia Borane to Boron Nitride. Inorg. Chem. 2011, 50,783-792.

Grant, D. J.; Matus, M. H.; Anderson, K. D.; Camaioni, D. M.; Neufeldt, S. R.; Lane, C. F.; Dixon, D. A., Thermochemistry for the Dehydrogenation of Methyl-Substituted Ammonia Borane Compounds. J. Phys. Chem. A 2009, 113, 6121-6132.

Heldebrant, D. J.; Karkamkar, A.; Hess, N. J.; Bowden, M.; Rassat, S.; Zheng, F.; Rappe, K.; Autrey, T., The Effects of Chemical Additives on the Induction Phase in Solid-State Thermal Decomposition of Ammonia Borane. Chem. Mat. 2008, 20, 5332-5336.

Himmelberger, D. W.; Alden, L. R.; Bluhm, M. E.; Sneddon, L. G., Ammonia Borane Hydrogen Release in Ionic Liquids. Inorg. Chem. 2009, 48, 9883-9889.

Kalidindi, S. B.; Sanyal, U.; Jagirdar, B. R., Nanostructured Cu and Cu@Cu(2)O core shell catalysts for hydrogen generation from ammonia-borane. Phys. Chem. Chem. Phys. 2008, 10, 5870-5874.

Kondrat'ev, Y. V.; Butlak, A. V.; Kazakov, I. V.; Timoshkin, A. Y., Sublimation and thermal decomposition of ammonia borane: Competitive processes controlled by pressure. Thermochim. Acta 2015, 622, 64-71.

Li, Z.; He, T.; Liu, L.; Chen, W. D.; Zhang, M.; Wu, G. T.; Chen, P., Covalent triazine framework supported non-noble metal nanoparticles with superior activity for catalytic hydrolysis of ammonia borane: from mechanistic study to catalyst design. Chem. Sci. 2017, 8, 781-788.

Pfeil, M. A.; Groven, L. J.; Lucht, R. P.; Son, S. F., Effects of ammonia borane on the combustion of an ethanol droplet at atmospheric pressure. Combust. Flame 2013, 160, 2194-2203.

Pfeil, M. A.; Kulkarni, A. S.; Ramachandran, P. V.; Son, S. F.; Heister, S. D., Solid Amine-Boranes as High-Performance and Hypergolic Hybrid Rocket Fuels. J. Propul. Power 2016, 32, 23-31.

Ramachandran, P. V.; Gagare, P. D., Preparation of ammonia borane in high yield and purity, methanolysis, and regeneration. Inorg. Chem. 2007, 46, 7810-7817.

Ramachandran, P. V.; Kulkarni, A. S.; Pfeil, M. A.; Dennis, J. D.; Willits, J. D. Heister, S. D.; Son, S. F.; Pourpoint, T. L., Amine-Boranes: Green Hypergolic Fuels with Consistently Low Ignition Delays. Chem.-Eur. J. 2014, 20, 16869-16872.

Spalding, M. J.; Krier, H.; Burton, R. In Emission spectroscopy during ignition of boron particles at high pressure, 35th AIAA Aerospace Sciences Meeting and Exhibit, 1997; pp. 97-0119.

Stowe, A. C.; Shaw, W. J.; Linehan, J. C.; Schmid, B.; Autrey, T., In situ solid state B-11 MAS-NMR studies of the thermal decomposition of ammonia borane mechanistic studies of the hydrogen release pathways from a solid state hydrogen storage material. Phys. Chem. Chem. Phys. 2007, 9, 1831-1836.

Valero-Pedraza, M. J.; Martin-Cortes, A.; Navarrete, A.; Bermejo, M. D.; Martin, A., Kinetics of hydrogen release from dissolutions of ammonia borane in different ionic liquids. Energy 2015, 91, 742-750.

Van Wie, D. M.; D'Alessio, S. M.; White, M. E., Hypersonic airbreathing propulsion. Johns Hopkins APL Tech. Dig. 2005, 26, 430-437.

Wen, L.; Zheng, Z.; Luo, W.; Cai, P.; Cheng, G. Z., Ruthenium deposited on MCM-41 as efficient catalyst for hydrolytic dehydrogenation of ammonia borane and methylamine borane. Chin. Chem. Lett. 2015, 26, 1345-1350.

Wolf, G.; Baumann, J.; Baitalow, F.; Hoffmann, F., Calorimetric process monitoring of thermal decomposition of B—N—H compounds. Thermochim. Acta 2000, 343, 19-25.

Yang, K. K.; Yao, Q. L.; Huang, W.; Chen, X. S.; Lu, Z. H., Enhanced catalytic activity of NiM (M = Cr, Mo, W) nanoparticles for hydrogen evolution from ammonia borane and hydrazine borane. Int. J. Hydrog. Energy 2017, 42, 6840-6850.

Yang, L.; Luo, W.; Cheng, G. Z., Graphene-Supported Ag-Based Core-Shell Nanoparticles for Hydrogen Generation in Hydrolysis of Ammonia Borane and Methylamine Borane. ACS Appl. Mater. Interfaces 2013, 5, 8231-8240.

Zhan, W. W.; Zhu, Q. L.; Xu, Q., Dehydrogenation of Ammonia Borane by Metal Nanoparticle Catalysts. ACS Catal. 2016, 6, 6892-6905.

\* cited by examiner

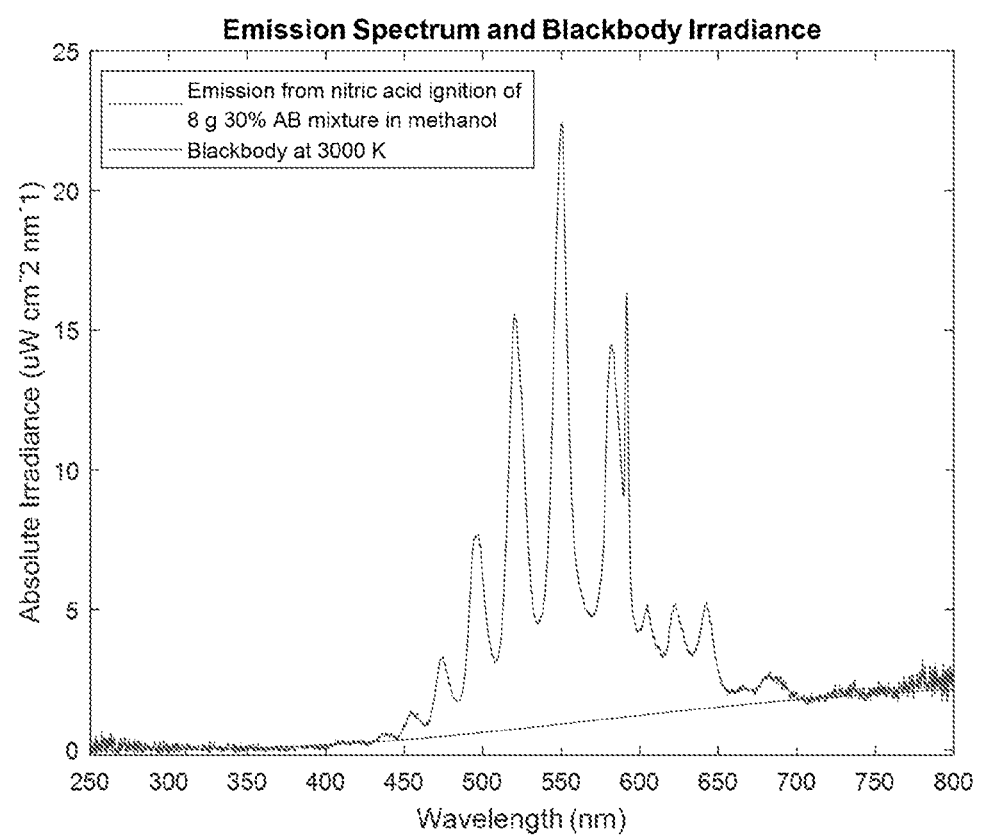

PHASE-CHANGING BORANE CONTAINING FUEL

CROSS-REFERENCE TO RELATED APPLICATIONS

This application claims the benefit of U.S. Provisional Application No. 62/682,448 filed Jun. 8, 2018, which is hereby incorporated by reference in its entirety.

STATEMENT REGARDING FEDERALLY SPONSORED RESEARCH

This invention was made with Government Support under Grant No. W31P4Q-12-C-0139 awarded by the Department of Defense. The Government has certain rights in the invention.

FIELD

The present disclosure generally relates to phase changing fuels, particularly to phase changing fuels comprising borane-containing compounds.

BACKGROUND

The desire to field air-breathing missiles capable of speeds greater than Mach 8 necessitates fuels that burn fast enough that combustion takes place inside the engine. Hydrogen is the ideal fuel for operation above Mach 8, but its density and storage requirements have limited its application. The air-breathing missile application is restricted by volumetric constraints, storage, and deployment requirements rendering the cryogenic option impractical. Ammonia borane is a solid source of hydrogen. The ability of ammonia borane and its derivatives to produce hydrogen has been studied in pyrolytic, thermal, ionic liquid, and metal-catalyzed systems. These studies, however, generally relate to the addition of ammonia borane and its derivatives to base fuels as a method to improve the base fuel's combustion. For example, U.S. Pat. Nos. 4,197,081 and 4,201,553 describe addition of between 0.5% and 15% by weight of borane-containing hydrogen carrier to base fuel to improve combustion.

Improved borane materials that can flow and pump are needed as fuels. The compositions, systems, and methods disclosed herein address these and other needs.

SUMMARY

In accordance with the purposes of the disclosed compositions, systems, and methods, as embodied and broadly described herein, the disclosed subject matter relates to compositions and systems that can be provided as a phase-changing fuel which can generate hydrogen. Methods of making and using the compositions and systems are also disclosed.

The hydrogen generation compositions, also referred to herein in some embodiments as hypergolic compositions, described herein can comprise a hydrogen carrier at least partially dissolved in a polar organic solvent. The hydrogen carrier can include ammonia borane and an alkylamine borane of the Formula (I),

$$R^1R^2HN\text{—}BHR^3R^4 \quad (I),$$

wherein $R^1$, $R^2$, $R^3$ and $R^4$ are each independently selected from hydrogen, substituted or unsubstituted $C_{1\text{-}10}$ alkyl, substituted or unsubstituted $C_{2\text{-}10}$ alkenyl, or substituted or unsubstituted $C_{6\text{-}14}$ aryl, or any two of $R^1$, $R^2$, $R^3$ and $R^4$ are linked together with the nitrogen and/or boron atoms to which they are attached, forms a ring, wherein at least one of $R^1$ and $R^2$ is not hydrogen. In some embodiments, $R^1$, $R^2$, $R^3$ and $R^4$ are each independently selected from hydrogen, unsubstituted $C_{1\text{-}10}$ alkyl, unsubstituted $C_{2\text{-}10}$ alkenyl, or unsubstituted $C_{6\text{-}14}$ aryl, or any two of $R^1$, $R^2$, $R^3$ and $R^4$ are linked together with the nitrogen and/or boron atoms to which they are attached, forms a ring.

In some embodiments, the alkylamine borane of Formula (I) can be selected from a $C_{1\text{-}6}$ alkylamine borane, preferably a $C_{1\text{-}3}$ alkylamine borane or a $C_{1\text{-}6}$ alkylenediamine bisborane, preferably a $C_{1\text{-}3}$ alkylenediamine bisborane. Representative examples of alkylamine boranes of Formula (I) include methylamine borane, dimethylamine borane, ethylamine borane, propylamine borane, butylamine borane, pentylamine borane, hexylamine borane, methylenediamine bisborane, ethylenediamine bisborane, or mixtures thereof. The weight ratio of ammonia borane to the alkylamine borane in the hydrogen carrier can be 1:9 or greater (for example, 1:5 or greater, 1:2 or greater, 1:1 or greater, 2:1 or greater, 5:1 or greater, 9:1 or greater, from 1:9 to 9:1, or from 1:9 to 1:1).

As described herein, the hydrogen carrier is at least partially dissolved in a polar organic solvent. The polar organic solvent can include an alcohol or a nitrile. In some examples, the polar organic solvent can include a $C_{1\text{-}4}$ alcohol such as methanol, ethanol, 1-propanol, 2-propanol, 1-butanol, 2-butanol or mixtures thereof, or a $C_{1\text{-}4}$ nitrile such as acetonitrile.

The physical state (such as solid or liquid) of the hydrogen generation composition can depend on the concentration of the hydrogen carrier in the polar organic solvent. For example, the hydrogen carrier can be present in the hydrogen generation composition in an amount of at least 75% by weight (for example, at least 80% by weight, at least 85% by weight, or at least 90% by weight), based on the weight of the hydrogen generation composition. In these embodiments, the hydrogen generation composition can be a liquid at room temperature or greater (25° C. or greater). In some examples, the hydrogen carrier can be present in an amount of at least 60% by weight (for example, from 60% to 85% by weight), based on the weight of the hydrogen generation composition. In these embodiments, the hydrogen generation compositions can be a liquid below room temperature, such as 5° C. or greater. The hydrogen generation system can have a hydrogen density of at least 0.12 g/mL, depending on the concentration of hydrogen carrier present.

Fuels comprising the hydrogen generation compositions are also disclosed.

Methods for the production of hydrogen from the hydrogen generation compositions are further disclosed. The method can include contacting the hydrogen generation composition with an ignition source to release hydrogen. The ignition source can be selected from an oxidizing agent, a flame, a spark, or combinations thereof. In some examples, an acidic oxidizing agent such as nitric acid can be used as the ignition source.

Additional advantages of the disclosed process will be set forth in part in the description which follows, and in part will be obvious from the description, or can be learned by practice of the disclosed process. The advantages of the disclosed process will be realized and attained by means of the elements and combinations particularly pointed out in the appended claims. It is to be understood that both the foregoing general description and the following detailed description are exemplary and explanatory only and are not restrictive of the disclosed process, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURE

The accompanying FIGURE, which is incorporated in and constitutes a part of this specification illustrates aspects described below.

FIG. 1 is a line graph showing an emission spectrum of a hydrogen generation composition comprising 30% ammonia borane (AB) and 70% methylamine borane (MeAB) in methanol after ignition with nitric acid.

DETAILED DESCRIPTION

The materials, compounds, compositions, articles, and methods described herein can be understood more readily by reference to the following detailed description of specific aspects of the disclosed subject matter and the Examples and FIGURE included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an alkylamine" includes mixtures of two or more such alkylamines, reference to "the solvent" includes mixtures of two or more such solvents, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Chemical Definitions

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt %) of a component, unless specifically stated to the contrary, is based on the total weight of the formulation or composition in which the component is included.

As used herein, the term "hypergolic" is contemplated to include a composition that ignites spontaneously when it comes into contact with a chemical stimulus such as an oxidizer.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as $—OA^1$ where $A^1$ is alkyl as defined above.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This may be presumed in structural formulae herein wherein an asymmetric alkene is present, or it may be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The terms "amine" or "amino" as used herein are represented by the formula $NA^1A^2A^3$, where $A^1$, $A^2$, and $A^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "hydroxyl" as used herein is represented by the formula —OH.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Reference will now be made in detail to specific aspects of the disclosed materials, compounds, compositions, formulations, articles, and methods, examples of which are illustrated in the accompanying Examples and FIGURE.

Hydrogen Generation Compositions

Boranes ($B_xH_y$) have been explored as potential fuels, but due to their high volatility, toxicity, reactivity with many organic solvents, and solid product formation ($B_2O_3$) upon oxidation, much of the interests shifted away. Ammonia borane materials are hypergolic with materials such as nitric acid as an oxidizer. This spontaneous ignition has been observed for both solid ammonia borane materials and salts with borane cluster anions in combustible solvents or ionic liquids. However, there are no reports of alkylamine borane materials in liquid mixtures. Amine borane materials are of interest as hypergolic fuels as they are more environmentally friendly than other options such as hydrazine and they have low ignition delays. Further, liquid hypergolic compositions are also of interest because they can advantageously flow, pump, and do not need to be heated prior to use.

Disclosed herein are hydrogen generation compositions comprising a solvent, that are stable and can ignite in the presence of a hypergolic material or flame. The hydrogen generation compositions comprise a "hydrogen carrier," also referred to herein as a hydrogen storage material at least partially dissolved in a solvent. The hydrogen carrier uses the elements nitrogen and boron to chemically bond hydrogen and can release hydrogen as a product of a physical or chemical reaction. In some examples, the hydrogen carrier comprises ammonia borane and amine borane compounds at least partially dissolved in a suitable solvent. In this disclosure, the hydrogen carrier act as the primary hypergol (fuel source) in the compositions disclosed herein. For example, the borane compounds present in the hydrogen carrier do not serve as an additive to improve combustion of a base fuel, such as a combustible solvent but rather act as the base fuel themselves.

Hydrogen Carrier

As described herein, the hydrogen carrier comprises borane containing compounds. In some embodiments, the hydrogen carrier comprises ammonia borane ($NH_3BH_3$). Ammonia borane, isoelectronic with ethane, is a solid at room temperature, stable in air and water and contains about 100 grams to 140 grams hydrogen per liter (that is up to about 20% wt. hydrogen). Ammonia borane, having a melting point in the range of 110 to 116° C., is soluble in relatively polar coordinating solvents.

Various conventional methods have been used in the art to dehydrogenate ammonia borane to release hydrogen. These conventional methods include: solid state thermal decomposition, hydrolysis, transition metal catalyzed dehydrogenation, ionic liquid catalyzed dehydrogenation, solution phase thermal decomposition, and nanophase ammonia borane. Dehydrogenation of hydrogen from ammonia borane through multiple steps has been described in U.S. Patent Publication No. 2011/0008693. At temperatures of less than 150° C., ammonia borane can produce up to 12 wt % hydrogen. At slightly higher temperatures, the crosslinking between molecules can release additional hydrogen. Conventional dehydrogenation reactions of ammonia borane often involve the formation of byproducts, such as diborane ($B_2H_6$) and borazine ($B_3N_3H_6$), both are combustive and toxic to polymer electrolyte membranes (PEM) of PEM fuel cells. Moreover, conventional dehydrogenation of ammonia borane at 85° C. needs several hours of incubation to start while an amount of hydrogen desorbed thereto is no greater than 7 weight percent.

It has been found, ammonia borane can be utilized as an effective hydrogen carrier for fuels when coupled with an alkylamine borane compound as described herein, wherein the release of hydrogen is kinetically practical for fuel applications and wherein the dehydrogenation reaction involves formation of more environmentally friendly byproducts. The alkylamine borane can be represented by a structure of Formula (I), $$R^1R^2HN\text{---}BHR^3R^4 \qquad (I),$$

wherein $R^1$, $R^2$, $R^3$ and $R^4$ are each independently selected from hydrogen, substituted, unsubstituted, branched or unbranched $C_{1-10}$ alkyl, substituted, unsubstituted, branched or unbranched $C_{2-10}$ alkenyl, substituted or unsubstituted $C_{3-10}$ cycloalkyl, or substituted or unsubstituted $C_{6-14}$ aryl, or any two of $R^1$, $R^2$, $R^3$ and $R^4$ are linked to form a $C_{2-10}$ alkylene, which together with the nitrogen and/or boron atoms to which they are attached, forms a ring, wherein at least one of $R^1$ and $R^2$ is not hydrogen. $R^1$, $R^2$, $R^3$ and $R^4$ can be branched or unbranched. $R^1$, $R^2$, $R^3$ and $R^4$ can be unsubstituted or substituted with $C_1$-$C_6$ alkyl, $C_1$-$C_6$ alkyl halide, $C_1$-$C_6$ alkoxy, hydroxyl, halogen, amine, alkylamine, and alkylammonium.

In some embodiments of Formula I, $R^1$, $R^2$, $R^3$ and $R^4$ are different. In other embodiments of Formula I, $R^1$, $R^2$, $R^3$ and $R^4$ are the same.

In some embodiments of Formula I, $R^1$, $R^2$, $R^3$ and $R^4$ are each simultaneously or independently selected from hydrogen, substituted, unsubstituted, branched or unbranched $C_{1-6}$ alkyl, substituted or unsubstituted $C_{3-10}$ cycloalkyl, and substituted or unsubstituted $C_{6-10}$ aryl or any two of $R^1$, $R^2$, $R^3$ and $R^4$ are linked to form a branched or unbranched $C_{2-6}$ alkylene, which together with the nitrogen and/or boron atoms to which they are attached, forms a ring. In some examples of Formula I, $R^1$, $R^2$, $R^3$ and $R^4$ are each simultaneously or independently selected from hydrogen, substituted, unsubstituted, branched or unbranched $C_{1-6}$ alkyl, substituted or unsubstituted $C_{3-10}$ cycloalkyl, and substituted or unsubstituted $C_{6-10}$ aryl. In some examples of Formula I, $R^1$, $R^2$, $R^3$ and $R^4$ are each simultaneously or independently selected from hydrogen, branched or unbranched $C_{1-6}$ alkyl, such as $C_1$ alkyl, $C_2$ alkyl, $C_3$ alkyl, $C_4$ alkyl, $C_5$ alkyl, or $C_6$ alkyl.

In some embodiments of Formula I, $R^1$, $R^2$, $R^3$ and $R^4$ are each simultaneously or independently selected from hydrogen, unsubstituted, branched or unbranched $C_{1-6}$ alkyl, unsubstituted $C_{3-10}$ cycloalkyl, and unsubstituted $C_{6-10}$ aryl. In some examples of Formula I, $R^1$, $R^2$, $R^3$ and $R^4$ are each simultaneously or independently selected from hydrogen, unsubstituted, branched or unbranched $C_{1-6}$ alkyl, unsubstituted $C_{3-10}$ cycloalkyl, and unsubstituted $C_{6-10}$ aryl. In some examples of Formula I, $R^1$, $R^2$, $R^3$ and $R^4$ are each simultaneously or independently selected from hydrogen, branched or unbranched $C_{1-6}$ alkyl, such as $C_1$ alkyl, $C_2$ alkyl, $C_3$ alkyl, $C_4$ alkyl, $C_5$ alkyl, or $C_6$ alkyl.

In some embodiments of Formula I, only one of $R^1$, $R^2$, $R^3$ and $R^4$ is not hydrogen. For example, $R^2$, $R^3$ and $R^4$ can be hydrogen and $R^1$ selected from substituted, unsubstituted, branched or unbranched $C_{1-6}$ alkyl, substituted or unsubstituted $C_{3-10}$ cycloalkyl, and substituted or unsubstituted $C_{6-10}$ aryl. In other examples, $R^1$, $R^2$ and $R^3$ can be hydrogen and $R^4$ selected from substituted, unsubstituted, branched or unbranched $C_{1-6}$ alkyl, substituted or unsubstituted $C_{3-10}$ cycloalkyl, and substituted or unsubstituted $C_{6-10}$ aryl.

In some embodiments of Formula I, $R^1$ and $R^2$ can be selected from substituted, unsubstituted, branched or unbranched $C_{1-6}$ alkyl, substituted or unsubstituted $C_{3-10}$ cycloalkyl, and substituted or unsubstituted $C_{6-10}$ aryl. In other examples, $R^1$ and $R^3$ can be selected from substituted, unsubstituted, branched or unbranched $C_{1-6}$ alkyl, substituted or unsubstituted $C_{3-10}$ cycloalkyl, and substituted or unsubstituted $C_{6-10}$ aryl.

In some examples, $R^1$, $R^2$, $R^3$ and $R^4$ can be independently substituted with one or more groups including, but not limited to, $C_{1-6}$ alkyl, halogenated $C_{1-6}$ alkyl, $C_{1-6}$ alkoxy, $C_{2-6}$ alkenyl, $C_{2-6}$ alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol.

In specific examples, the alkylamine borane of Formula I can include a $C_{1-6}$ alkylamine borane such as a $C_{1-3}$ alkylamine borane. For example, the compound of Formula I can include methylamine borane, dimethylamine borane, ethylamine borane, propylamine borane, butylamine borane, pentylamine borane, hexylamine borane, and mixtures thereof.

In specific examples, the alkylamine borane of Formula I can include a $C_{1-6}$ alkylenediamine bisborane such as a $C_{1-3}$ alkylenediamine bisborane. For example, the compound of Formula I can include methylenediamine bisborane or ethylenediamine bisborane.

The inclusion of the alkylamine borane of the Formula I synergistically improves the solubility of ammonia borane as a high-density hydrogen storage compound. It is appreciated that the alkylamine borane is itself a hydrogen containing compound and can also function as a primary hydrogen donor within the hydrogen carrier. As such, the alkylamine borane, while synergistically potentiating dehydrogenation of ammonia borane, also donates additional hydrogen content into the hydrogen generation compositions.

The weight ratio of ammonia borane to the alkylamine borane in the hydrogen carrier can be varied. It can depend on such factors as the type of alkylamine borane, the solvent, and the desired amount of hydrogen carrier. In some embodiments, the relative amounts of each component can be chosen to maximize the hydrogen content by weight while maintaining the fuel's ability to be pumped as a liquid. For example, the weight ratio of ammonia borane to the alkylamine borane in the hydrogen carrier can be 1:20 or greater, 1:15 or greater, 1:10 or greater, 1:9 or greater, 1:5 or greater, 1:2 or greater, 1:1 or greater, 2:1 or greater, 5:1 or greater, 9:1 or greater, or 10:1 or greater. In some embodiments, the weight ratio of ammonia borane to the alkylamine borane in the hydrogen carrier can be 20:1 or less, 15:1 or less, 10:1 or less, 9:1 or less, 5:1 or less, 2:1 or less, 1:1 or less, 1:2 or less, 1:5 or less, 1:9 or less, 1:10 or less, 1:15 or less, or 1:20 or less. In some embodiments, the weight ratio of ammonia borane to amine borane in the hydrogen carrier can be from 1:20 to 20:1, from 1:10 to 10:1, from 1:9 to 9:1, from 1:9 to 1:7, from 1:9 to 1:5, from 1:9 to 1:3, from 1:9 to 1:2, from 1:9 to 1:1, from 1:9 to 2:1, from 1:9 to 3:1, from 1:9 to 4:1, or from 1:9 to 5:1.

The amount of hydrogen carrier present in the hydrogen generation compositions can be varied depending on, for example, the desired physical state (such as solid or liquid) of the hydrogen generation composition. For example, the hydrogen carrier can be present in the hydrogen generation composition in an amount of 50% or greater by weight, based on the weight of the hydrogen generation system. In some embodiments, the hydrogen carrier can be present in an amount of 55% or greater, 58% or greater, 60% or greater, 65% or greater, 70% or greater, 75% or greater, 80% or greater, 85% or greater, 87% or greater, 90% or greater, 91% or greater, 92% or greater, 93% or greater, or 95% or greater by weight, based on the weight of the hydrogen generation composition. In some embodiments, the hydrogen carrier can be present in an amount of 95% or less, 90% or less, 85% or less, 80% or less, 78% or less, 75% or less, 72% or less, 70% or less, 65% or less, or 60% or less by weight, based on the weight of the hydrogen generation composition. In some embodiments, the hydrogen carrier can be present in an amount of from 50% to 95%, from 60% to 95%, from 65% to 95%, from 70% to 85%, from 75% to 85%, or from 70% to 80% by weight, based on the weight of the hydrogen generation composition.

Solvents

A liquid mixture of the hydrogen carrier can be readily generated by adding a solvent to a solid mixture of ammonia borane and alkylamine borane to serve as a phase-changing hydrogen generation composition which can generate hydrogen. Liquid mixtures of hydrogen carriers as described herein are advantageous in that they can be stored as a solid and can form liquids prior to use. The liquid mixtures can flow, pump, do not need to be heated prior to use, and are easier to ignite using conventional, non-hypergolic, methods.

In some aspects, the hydrogen carrier comprising ammonia borane and the alkylamine borane can be at least partially dissolved in a solvent. As used herein, "at least partially dissolved" is inclusive of suspending the hydrogen carrier in a solvent, thereby forming a slurry or suspension for example. It is also inclusive of forming a solution or emulsion using the hydrogen carrier. A mixture comprising the at least partially dissolved hydrogen carrier can have a solids content of 95 wt % or less. For example the at least partially dissolved hydrogen carrier can have a solids content of 90 wt % or less, 85 wt % or less, 80 wt % or less, 75 wt % or less, 70 wt % or less, 60 wt % or less, 50 wt % or less, 40 wt % or less, or 30 wt % or less. In some examples, the at least partially dissolved hydrogen carrier can be completely dissolved (thereby having a solids content of 1 wt % or less) in the solvent.

The solvent used to at least partially dissolve the hydrogen carrier can include a polar organic solvent. In some cases, the polar organic solvent can be aprotic. The polar organic solvent can comprise at least 70% (for example, at least 75%, at least 80%, at least 85%, at least 90%, at least 95%, or up to 100%) by weight of the total amount of solvent present. Suitable examples of polar organic solvents that can at least partially dissolve the hydrogen carrier include alcohols, such as $C_{1-10}$ alcohols, preferably $C_{1-4}$ alcohols. Representative examples include methanol, ethanol, 1-propanol, 2-propanol, 1-butanol or 2-butanol. Other suitable examples of polar organic solvents include nitriles, such as $C_{1-10}$ nitriles, preferably $C_{1-4}$ nitriles. Representative examples include acetonitrile, propionitrile, or butyronitrile. Other examples of polar organic solvents include ethers such as tetrahydrofuran; alkylene glycol dialkyl ethers such as ethylene glycol diethyl ether; amides such as dimethylacetamide or N-methylpyrrolidone; ketones such as methyl ethyl ketone; sulfoxides or sulfones such as dimethyl sulfoxide or sulfolane; and alkylene carbonates such as propylene or butylene carbonate. The solvent can serve to fully dissolve or fully disperse the hydrogen carrier.

As described herein, the hydrogen generation compositions comprise ammonia borane and alkylamine borane at least partially dissolved in a solvent. In some examples, the hydrogen generation compositions comprise ammonia borane and alkylamine borane fully dissolved in a solvent such as methanol, ethanol, acetonitrile, or mixtures thereof. The hydrogen generation compositions are useful as hydrogen storage materials as they possess a high hydrogen storage capacity; exhibit suitable enthalpy of hydrogen desorption; and they are either liquids, or are capable of being dissolved in liquids under the desired operating conditions.

In some embodiments, the compositions described herein can be a liquid at room temperature or greater, such as at 25° C. or greater at 1 atmosphere, and can remain in the liquid phase throughout the hydrogen storage and/or hydrogen generation cycle. In other embodiments, the compositions can be a liquid below room temperature, for example 0° C. or below or −10° C. or below. In some embodiments, the compositions described herein can be a liquid from −20° C. to 50° C., from −15° C. to 40° C., or from 0° C. to 40° C., at 1 atmosphere.

The liquid hydrogen generation compositions can comprise at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, at least 20 wt % hydrogen (that is total mass of hydrogen/total mass of the hydrogen generation composition). For example, the liquid hydrogen generation compositions can comprise from 10 wt % to 25 wt %, from 12 wt % to 25 wt %, from 15 wt % to 25 wt %, or from 17 wt % to 25 wt % hydrogen.

The liquid hydrogen generation compositions can have a hydrogen density of 0.08 g/mL or greater, 0.09 g/mL or greater, 0.10 g/mL or greater, 0.11 g/mL or greater, 0.12 g/mL or greater, 0.13 g/mL or greater, 0.14 g/mL or greater, or 0.15 g/mL or greater. In some examples, the liquid hydrogen generation compositions can have a hydrogen density from 0.08 g/mL to 0.15 g/mL, from 0.09 g/mL to 0.15 g/mL, or from 0.10 g/mL to 0.15 g/mL.

The liquid hydrogen generation compositions can have a total density of 0.50 g/mL or greater, 0.55 g/mL or greater, 0.60 g/mL or greater, 0.65 g/mL or greater, 0.70 g/mL or greater, 0.75 g/mL or greater, 0.80 g/mL or greater, 0.85 g/mL or greater, 0.90 g/mL or greater, or 1.0 g/mL or greater. In some examples, the liquid hydrogen generation compositions can have a total density from 0.50 g/mL to 1.0 g/mL, or from 0.60 g/mL to 0.80 g/mL.

Propellant or Explosive Formulations

Also disclosed herein are propellant or explosive formulations. In some examples, the propellant or explosive formulation can comprise a hydrogen generation composition. The hydrogen generation composition can further include a stimulus such as an oxidizer, wherein the hydrogen generation composition and oxidizer are separate prior to use.

In some examples of the propellant or explosive formulations, the hydrogen carrier can comprise ammonia borane and an alkylamine borane such as any of those described in detail above. The propellant or explosive formulations further comprises a solvent. In some examples, an effective amount of the hydrogen carrier is suspended or dissolved in the solvent. In some examples, the concentration or amount of the hydrogen carrier in the solvent is from 20% to 99% by weight.

In some examples of the propellant or explosive formulations, the stimulus is an acid oxidizing agent such as nitric acid having a concentration of from 65% to 100% such as from 70% to 100%.

Methods

Also provided herein are methods of making and using the hydrogen generation compositions. In some examples, the method of making the hydrogen generation compositions can include mixing suitable amounts of ammonia borane and alkylamine borane followed by adding a solvent to at least partially dissolve the borane compounds. As described herein, the compositions can be stored as a solid and can then form liquids when the solvent is added. The solid mixture can be generated by heating suitable amounts of the alkylamine borane to a temperature of about 45° C. or greater, about 50° C. or greater, about 60° C. or greater, about 70° C. or greater, from about 45° C. to about 100° C. or from about 60° C. to about 80° C. The method can further include adding ammonia borane to the alkylamine borane to form a liquid mixture. The liquid mixture can be allowed to cool to room temperature, such as from about 18° C. to about 30° C. or from about 20° C. to about 25° C., where it solidifies.

In other embodiments, a solid mixture of the hydrogen carrier can be generated by at least partially dissolving suitable amounts of ammonia borane and alkylamine borane in excess solvent, such as methanol to form a suspension or solution. The solvent can then be evaporated and the solids dried using, for example a vacuum.

It has been found that a smaller amount of solvent, such as methanol is required to dissolve the pre-mixed hydrogen carrier (that is ammonia borane and alkylamine borane) than is required to dissolve ammonia borane and alkylamine borane separately. For example, individually, ammonia borane and alkylamine borane have solubilities of 0.230 g/mL and 0.833 g/mL methanol, respectively. A solid mixture with 30% ammonia borane and 70% alkylamine borane by weight has a solubility of greater than 5.0 g, greater than 5.5 g, or greater than 5.8 g per mL methanol. As described herein, the compositions are liquid and can remain a liquid at low temperatures. The amount of hydrogen carrier present in the liquid can be adjusted proportionally to the temperatures at which the compositions remain a liquid.

Without wishing to be bound by theory, using different purities of hydrogen carrier materials can lead to differences in the melting points and solubilities of their solid mixtures. For example, ammonia borane with a melting point of 116° C. can produce solid mixtures that require less solvent such as methanol to fully dissolve than does ammonia borane with a melting point of 111° C.

Also provided herein are methods of use of the hydrogen generation compositions disclosed herein. The compositions disclosed herein are so formulated as to release hydrogen with no substantial formation of dehydrogenation reaction byproducts such as borazine or diborane, which are toxic by-products. In some embodiments, the products of the combustion of the compositions disclosed herein have been found to include a major amount of boric acid, which is formed from $B_2O_3$ in the presence of water or from hydrogen in the solvent or ammonium borane or substituted ammonium borane. The combustion product of the compositions disclosed herein can be analyzed by Raman spectroscopy or the emission spectrum of the gas phase products. Without being limited to any particular theories, one of the mechanisms that dehydrogenation of the hydrogen carrier materials can be carried out in a relatively workable temperature range may be due to a synergistic interplay among the following several factors: the hydridic bond in $BH_3$ and protic bond in $NH_3$ within ammonia borane can form hydrogen gas with a low activation energy, the alkylamine borane being an additional hydrogen donor, and reduction of byproduct formation facilitated through low temperature dehydrogenation operation.

The hydrogen generation compositions disclosed herein can ignite spontaneously upon contact with a stimulus. The stimulus can include a chemical stimulus, a thermal stimulus, or a combination thereof. In some examples, the hydrogen generation composition can ignite spontaneously upon contact with an oxidizing stimulus. For example, the stimulus can include an acidic oxidizing agent such as nitric acid. In some examples, the hydrogen generation composition can ignite spontaneously upon contact with nitric acid that has a concentration of 65% or greater (e.g., 70% or greater, 75% or greater, 80% or greater, 85% or greater, 90% or greater, 95% or greater, 98% or greater, 99% or greater, 99.5% or greater, or 99.8% or greater). In some examples, the hydrogen generation composition can ignite spontaneously upon contact with nitric acid that has a concentration of 100% or less (e.g., 99.8% or less, 99.5% or less, 99% or less, 98% or less, 95% or less, 90% or less, 85% or less, 80% or less, 75% or less, 70% or less, or 65% or less). In some examples, the hydrogen generation compositions can ignite spontaneously upon contact with nitric acid that has a concentration in the range from 65% to 100% (e.g., 70% to 100%, 75% to 99%, 70 to 85%, 85% to 100%, 70% to 75%, 75% to 80%, 80% to 85%, 85% to 90%, 90% to 95%, 95% to 100%, 75% to 95%, 75% to 85%, 85% to 95%, or 80% to 90%).

In some examples, the ignition delay of the hydrogen generation composition with an oxidizer, such as nitric acid, is less than 20 ms (e.g., less than 18 ms, less than 16 ms, less than 15 ms, or less than 10 ms).

Other oxidizing stimuli that may ignite the hydrogen generation composition can include hydrogen peroxide, hydroxylammonium nitrate (HAN), ammonium dinitramide (ADN), ammonium nitro formate and mixtures thereof. The compositions disclosed herein can release hydrogen in the absence of catalysts, including transition metal catalyst. Chemical release of hydrogen is optionally conducted with heating such as at a temperature from 50° C. to 200° C., more particularly from 50° C. to 80° C.

In some examples, the hydrogen generation composition can ignite spontaneously upon heating the composition at a sufficiently high temperature to affect release of at least one dihydrogen equivalent. For instance, the compound may be heated at a temperature of at least 50° C. (for example, at least 70° C., at least 80° C., at least 100° C., or at least 150° C.). In some embodiments, a flame or a spark gap (generated from a tungsten electrode for example) can be used as an ignition source to thermally ignite the compositions. In these embodiments, the hydrogen generation composition is preferably in the form of small droplets, such as a spray.

In some examples, the ignition delay of the hydrogen generation composition upon heating (for example with a flame or spark) is less than 5 ms (e.g., less than 4 ms, less than 3 ms, less than 2 ms, or less than 1 ms).

Solid mixtures of the hydrogen carrier can be heated to generate a liquid. These mixtures are liquids above room temperature. These liquids can be ignited thermally or chemically as described herein.

In some examples, methods of using the hydrogen generation compositions as propellants or explosives comprising combining the hydrogen generation compound or hydrogen generation composition with nitric acid are also provided.

As disclosed herein, the hydrogen carrier can act as the primary fuel in the hydrogen generation compositions. In some examples, the hydrogen generation compositions can be mixed with a secondary combustible substance, such as an additive. For example, the hydrogen generation compositions can be mixed with a combustible solvent, such as tetrahydrofuran, acetone, ethyl acetate, or a combination thereof. Other existing or known hypergols include, for example, rock propellant-1 (RP-1), kerosene, furfuryl alcohol, hydrazine, hypergolic ionic liquid, methane, or a combination thereof.

The compositions and methods disclosed herein have many applications. In some embodiments, the compositions and methods can be used to generate hydrogen, which is supplied to a hydrogen fuel cell. Hydrogen generators can include a first compartment holding an oxidizing agent solution and a second compartment holding the hydrogen carrier in a solvent. Control electronics can be coupled to flow controllers that can control the flow of the oxidizing agent and/or composition. For example, the oxidizing agent can be provided in the first compartment and be pumped using control electronics into the second compartment holding the composition. In alternate embodiments, the composition can be provided in the first compartment and be pumped using control electronics into the second compartment holding the oxidizing agent. In some embodiments, the oxidizing agent and/or the liquid hydrogen generation composition can be provided as small droplets, such as a spray.

The compositions disclosed herein can be provided as fuels which are capable of releasing high energy on ignition. In some embodiments, the compositions can be used as a fuel additive for rockets, missiles and military jet aircraft. In some embodiments, the compositions disclosed herein can also provide a viable solution to many military and civilian applications in need of a lightweight, highly dependable power source. Examples include, among others, auxiliary power units for small and remote applications, shelter power, emergency power, external power pack, battery charger, portable power for soldiers, unmanned aerial vehicles, and robotics. For example, the hydrogen generation compositions can be incorporated into a portable power cell, or may be installed in conjunction with a hydrogen-burning engine. The hydrogen generation compositions can be used in or with a hydrogen-powered vehicle, such as an automobile. Alternatively, the hydrogen generation compositions can be installed in or near a residence, as part of a single-home or multi-home hydrogen-based power generation system. Larger versions of the hydrogen generation compositions can be used in conjunction with, or in replacements for, conventional power generating stations.

The hydrogen carrier disclosed herein can have a heat of combustion of at least 8 kcal/g (e.g., at least 8.5 kcal/g, at least 9 kcal/g, at least 9.5 kcal/g, at least 10 kcal/g, at least 10.5 kcal/g, at least 11 kcal/g, at least 11.5 kcal/g, at least 12 kcal/g, at least 12.5 kcal/g, at least 13 kcal/g, or at least 15 kcal/g). The compositions comprising the hydrogen carrier and solvent disclosed herein can have a heat of combustion of at least 8 kcal/g (e.g., at least 8.5 kcal/g, at least 9 kcal/g, at least 9.5 kcal/g, at least 10 kcal/g, at least 10.5 kcal/g, at least 11 kcal/g, at least 11.5 kcal/g, at least 12 kcal/g, at least 12.5 kcal/g, at least 13 kcal/g, or at least 15 kcal/g). The heat of combustion can be determined using a bomb calorimeter and/or calculated using the experimental bomb calorimeter data and/or literature values for heat of combustion.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1: Phase-Changing Fuel Containing Ammonia Borane, Methylamine Borane, and Methanol Phase-changing fuels containing ammonia borane, methyl-substituted amine boranes, and methanol, which can be combusted in air with various ignition sources, have been prepared.

The desire to field air-breathing missiles capable of speeds greater than Mach 8 necessitates fuels that burn fast enough that combustion takes place inside the engine. Hydrogen is the ideal fuel for operation above Mach 8, but this fuel's density and storage requirements have limited its application. The air-breathing missile application is restricted severely by volumetric constraints, storage, and deployment requirements rendering the cryogenic option impractical. Hydrogen has a higher specific impulse at high velocity than hydrocarbon fuels. Van Wie, D. M., et al., *Johns Hopkins APL Tech. Dig.* 2005, 26, 430-437. Ammonia borane is a solid source of hydrogen. The ability of ammonia borane and its derivatives to produce hydrogen has been studied in pyrolytic, thermal, ionic liquid, and metal-catalyzed (in both water and methanol solutions) systems. Frueh, S. et al., *Inorg. Chem.* 2011, 50, 783-792; Wolf, G. et al., *Thermochim. Acta* 2000, 343, 19-25; Heldebrant, D. J. et al., *Chem. Mat.* 2008, 20, 5332-5336; Baumann, J. et al., *Thermochim. Acta* 2005, 430, 9-14; Kondrat'ev, Y. V. et al., *Thermochim. Acta* 2015, 622, 64-71; Stowe, A. C. et al., *Phys. Chem. Chem. Phys.* 2007, 9, 1831-1836; Grant, D. J. et al., *J. Phys. Chem. A* 2009, 113, 6121-6132; Bluhm, M. E. et al., *J. Am. Chem. Soc.* 2006, 128, 7748-7749; Himmelberger, D. W. et al., *Inorg. Chem.* 2009, 48, 9883-9889; Ahluwalia, R. K. et al., *Int. J. Hydrog. Energy* 2011, 36, 15689-15697; Valero-Pedraza, M. J. et al., *Energy* 2015, 91, 742-750; Ramachandran, P. V. et al., *Inorg. Chem.* 2007, 46, 7810-7817; Kalidindi, S. B. et al., *Phys. Chem. Chem. Phys.* 2008, 10, 5870-5874; Erdogan, H. et al., *Phys. Chem. Chem. Phys.* 2009, 11, 10519-10525; Dai, H. B. et al., *J. Power Sources* 2010, 195, 307-312; Chen, G. Z. et al., *Chem.-Eur. J.* 2012, 18, 7925-7930; Yang, L. et al., *ACS Appl. Mater. Interfaces* 2013, 5, 8231-8240; Wen, L. et al., *Chin. Chem. Lett.* 2015, 26, 1345-1350; Zhan, W. W. et al., *ACS Catal.* 2016, 6, 6892-6905; Yang, K. K. et al., *Int. J. Hydrog. Energy* 2017, 42, 6840-6850; Li, Z. et al., *Chem. Sci.* 2017, 8, 781-788.

While the addition of ammonia borane and its derivatives to base fuels as a method to improve base fuel combustion has been documented (Pfeil, M. A. et al., *Combust. Flame* 2013, 160, 2194-2203; Osborg, H. et al., U.S. Pat. No. 4,197,081; and Osborg, H. et al., U.S. Pat. No. 4,201,553), no mention of high weight percent ammonia borane liquid solutions with the intent of ammonia borane combustion appears. U.S. Pat. Nos. 4,197,081 and 4,201,553 specified that between 0.5 and 15 weight percent of hydrogen carrier would be added to a base fuel to improve combustion. Not only do the materials disclosed here contain high weight percent hydrogen carrier, they also do not serve to improve the combustion of the base fuel, instead acting as the primary fuel source themselves. U.S. Pat. No. 8,685,364 discloses mixing ammonia borane with a suitable amine borane to generate a liquid and a liquid product after dehydrogenation. U.S. Pat. No. 7,901,491 discloses a metal hydride (including ammonia borane) and organic hydrogen carrier for use as a hydrogen source for fuel cells. The temperature range for hydrogen absorption/desorption is 100 to 300° C. Methanol is not an organic hydrogen carrier as defined in this patent because it does not release hydrogen upon heating and transform to a dehydrogenated liquid form. Ammonia borane and its derivatives have been investigated for propulsion, but no mention of amine borane material methanol liquid solutions appear. Pfeil, M. A. et al., *J. Propul. Power* 2016, 32, 23-31. There is no discussion of a phase-changing fuel that is stored as a solid and employed as a liquid, which is the focus of the present patent.

Ammonia borane materials are hypergolic with materials such as nitric acid and hydrogen peroxide as oxidizers. This spontaneous ignition has been observed for both solid ammonia borane materials and salts with borane cluster anions in combustible solvents or ionic liquids, but prior to this disclosure has not been documented for amine borane materials in liquid solution with methanol or liquid amine borane material mixtures. Pfeil, M. A. et al.; Ramachandran, P. V. et al., *Chem.-Eur. J.* 2014, 20, 16869-16872; and U.S. Patent Application US 2014/0373984 to McCrary, P. D. et al. Amine borane materials are of interest as hypergolic fuels as they are more environmentally friendly than other options such as hydrazine and they have low ignition delays.

Liquid solutions of ammonia borane and its derivatives in methanol improve upon non-dissolved mixtures in that they can be stored as a solid and can form liquids when methanol is added. The resulting mixtures can flow, can be pumped, do not need to be heated prior to use, and are easier to ignite using conventional, non-hypergolic, methods. The fluids can also be ignited in a spray by a spray of liquid nitric acid as the oxidant for a hypergolic fuel.

The present example is a liquid solution of ammonia borane and methyl-substituted amine boranes in methanol. The relative amounts of these components are chosen to maximize the hydrogen content by weight while maintaining the fuel's ability to be pumped as a liquid. The liquid solution can be readily generated by adding methanol to a solid mixture of ammonia borane in methyl-substituted amine boranes to serve as a phase-changing fuel which can generate hydrogen.

Another aspect of this example relates to the hypergolic combination of the liquid, either solution or neat, fuel with oxidizers such as nitric acid.

Experimental

The demonstration of this example is performed by mixing the desired amounts of ammonia borane (AB) and methylamine borane (MeAB) and then adding methanol. Two methods for generating the solid mixture were employed. The first method included heating a specific amount of MeAB contained in a round-bottom flask containing with a stir bar to about 60° C. in the glovebox, then adding AB slowly while stirring to ensure complete mixing. The liquid was allowed to cool slowly to room temperature, where it solidified. The second method of mixing included dissolving the desired amounts of AB and MeAB in excess methanol so that a clear liquid solution was formed, using a rotary evaporator to remove the methanol, and then drying the solid mixture under vacuum overnight.

It was found that a much smaller amount of methanol was required to dissolve the pre-mixed AB/MeAB than was initially required to dissolve AB and MeAB separately. The methanol solubilities of solid mixtures with 10, 20, 30, 35, 40, 50, 60, 70, 80, and 90% AB in MeAB were measured by adding methanol dropwise to solid mixtures in round bottom flasks while stirring until clear liquids were observed. The results are shown in Table 1.

Results

Individually, the AB and MeAB have solubilities of 0.230 g/mL and 0.833 g/mL methanol, respectively. A solid mixture with 30% AB and 70% MeAB by mass has the highest solubility of all the tested solid mixtures giving 5.88 g/mL methanol. This liquid solution is 17.6 wt % hydrogen (total mass of hydrogen/total mass of system) and 88 wt % hydrogen carrier (total mass of AB and MeAB/total mass of system). The total density of this clear solution is 0.70 g/mL, so the hydrogen density is 0.12 g/mL. A slurry or cloudy liquid would have an even higher hydrogen density and could still be readily pumped. A solution of 30% AB (from source 2) and 70% MeAB by mass and methanol at 25% saturation remains a liquid until 5° C. With further dilution the solution would remain liquid at even lower temperatures.

Using different purities of AB and MeAB starting materials leads to slightly different melting points and solubilities of their solid mixtures. AB from Source 1 (obtained from Sigma Aldrich as 97% ammonia borane as demonstrated by $^1$H NMR) with a melting point of 116° C. generally produced solid mixtures that required less methanol to fully dissolve than did AB from Source 2 (obtained from Boron Specialties LLC, impurities may include borohydride, such as sodium borohydride, as demonstrated by $^1$H NMR) with a melting point of 111° C. (Table 1). All solid mixtures were made in a glovebox with anhydrous methanol at room temperature (the second mixing method described above).

TABLE 1

Melting points and amounts of methanol as a function of composition.

| Fraction AB | m.p. (° C.) | MeOH/g solid mixture (mL) AB Source 2 | wt % H | m.p. (° C.) | MeOH/g solid mixture (mL) AB Source 1 | wt % H |
|---|---|---|---|---|---|---|
| 0 | 57 | 1.18 | 15.2 | 57 | 1.18 | 15.2 |
| 0.1 | 44 | 0.67 | 16.1 | 42 | 0.65 | 16.1 |
| 0.2 | 33 | 0.45 | 16.6 | 32 | 0.35 | 16.9 |
| 0.3 | 32 | 0.27 | 17.3 | 31.5 | 0.17 | 17.6 |
| 0.35 | 31 | 0.32 | 17.2 | 31 | 0.29 | 17.3 |
| 0.4 | 34 | 0.74 | 16.3 | 32 | 0.6 | 16.5 |
| 0.5 | 36 | 1.14 | 15.7 | 32 | 0.88 | 16.1 |
| 0.6 | 47 | 1.7 | 15.2 | 45 | 1.6 | 15.3 |
| 0.7 | 81 | 2.61 | 14.6 | 62 | 2.2 | 14.8 |
| 0.8 | 84 | 2.9 | 14.5 | 85 | 3.1 | 14.4 |
| 0.9 | 100 | 3.8 | 14.2 | 100 | 3.8 | 14.2 |
| 1 | 111 | 4 | 14.2 | 116 | 4.25 | 14.1 |

Four different ignition sources have been used to combust the prepared fuel in air: (i) a Bunsen burner, (ii) a spark gap igniter, (iii) a nitric acid drop into solution, and (iv) a nitric acid spray. The methods of ignition using each source were as follows:

(i) The fuel was injected from a pipet through a Bunsen burner flame which ignites the fuel when the spray from the pipet contained fine droplets.

(ii) A spark gap was used for ignition of a spray of the liquid fuel in a custom-built combustion apparatus. The fuel was sprayed in between the tungsten electrodes of a spark gap, and ignition was observed if at least 4 mL of fuel were sprayed through it. A high-speed camera was used to measure the ignition time, and ignition occurred within 1 ms of a spark.

(iii) Concentrated nitric acid was dropped from a pipet into a methanol solution of amine borane materials which ignited the fuel. A high-speed camera was used to measure the ignition time for a methanol solution of amine borane materials when in contact with nitric acid. At 1000 frames per second, the frame when the first nitric acid drop hit the surface of the solution already contained a bright, white spot indicative of the beginning of combustion. (The same white spot was not observed on contact between pure methanol and nitric acid.) The first orange color, certainly indicating combustion, was observed 16 ms after contact of the nitric acid drop with the solution. The ignition delay of the hypergolic combination is less than 16 ms. Nitric acid was added dropwise to the inventive solution until combustion stopped. It took 1 mole equivalent of $HNO_3$ to burn 1.03 mole equivalent of AB and MeAB combined. The products of the combustion were analyzed by Raman spectroscopy and found to be mostly boric acid, which is formed from $B_2O_3$ in the presence of water. This is consistent with the observed emission spectrum of the gas phase products, which shows the formation of a boron oxide as well.

(iv) Nitric acid was used as an ignition source in the custom-built combustion apparatus. Nitric acid and the AB/MeAB/MeOH fuel were sprayed out of separate nozzles so that the sprays intersected. The fuel was backed by 500 psi of air and sprayed horizontally, while the nitric acid was backed by 30 psi of nitrogen and sprayed vertically.

During combustion of the liquid sprays, emission spectra were measured for wavelengths between 250 nm and 800 nm (FIG. 1). The green color of the flame is believed to be due to strong $BO_2$ emission between 450 and 650 nm, with the largest peak at 550 nm corresponding to the 0-0 transition. Spalding, M. J. et al., *35th AIAA Aerospace Sciences Meeting and Exhibit,* 1997; pp 97-0119. The temperature of the flame was estimated by comparing the baseline of the experimental emission spectrum to calculated blackbody irradiance at various temperatures. The spark-initiated combustion has an estimated temperature of 3000-3200 K. The hypergolic mixture burned in air at an estimated temperature of 3000 K.

Solid mixtures of AB/MeAB with no methanol can be heated to generate a liquid (See Table 1). These mixtures are liquids above room temperature. These liquids can be ignited with a spark as described in (ii) above. These liquids are hypergolic and can be combusted using nitric acid as the ignition source as described in (iii) and (iv) above.

Similar results are found with AB/dimethylAB mixtures in methanol although the % by weight hydrogen content is higher in AB/MeAB mixtures in methanol.

In summary, phase-changing fuels (solid to liquid) that include ammonia borane, methylamine borane (or dimethylamine borane), and methanol were prepared and combusted using various ignition sources, including nitric acid, which is hypergolic when combined with ammonia-borane-containing fuels.

Disclosed herein are amine borane material solutions in methanol that are liquid at room temperature and contains at least 75% by weight hydrogen carrier.

Also disclosed are amine borane material solutions in methanol that are a liquid below room temperature and contains at least 60% by weight hydrogen carrier.

Further disclosed are amine borane material solutions in methanol which are a fuel that can be ignited by an external energy source.

Disclosed are amine borane material solutions in methanol which are a fuel that is hypergolic when combined with an oxidizer.

Amine borane material solid mixtures can be heated to generate a liquid which are a fuel that can be ignited by an external energy source.

Amine borane material solid mixtures can be heated to generate a liquid which are a fuel that is hypergolic when combined with an oxidizer.

Example 2: Comparison of the Solubility of Ammonia Borane and Methylamine Borane in Methanol, Ethanol, and Acetonitrile Experimental The demonstration of this example is performed by pre-mixing the desired amounts of ammonia borane (AB) and methylamine borane (MeAB) in a solvent (methanol, ethanol or acetonitrile) followed by evaporating the solvent. The ratio of AB to MeAB was kept at 30:70 based on weight. The solubilities of the mixture are shown in Table 2.

TABLE 2

Solubility of 30/70 AB/MeAB mixtures.

| Solvent | Methanol | Ethanol | Acetonitrile |
|---|---|---|---|
| Solubility (ml/g mixture) | 0.17 | 0.15 | 0.12 |
| Solubility (g/ml solvent) | 5.88 | 6.67 | 8.33 |
| Wt % hydrogen carrier | 88 | 89 | 91 |
| Hydrogen density (g H/ml solution) with solvent H | 0.12 | 0.13 | 0.12 |
| Hydrogen density (g H/ml solution) without solvent H | 0.11 | 0.12 | 0.11 |
| Wt % hydrogen (total mass H/total mass system) with solvent H | 17.6 | 17.9 | 17.5 |
| Wt % hydrogen (total mass H/total mass system) without solvent H | 16.5 | 16.3 | 16.9 |

Results:
The solid mixtures with 30% AB and 70% MeAB by mass were soluble in methanol, ethanol, and acetonitrile.

Example 3: Heats of Combustion

The heats of combustion on a per gram and per liter basis of the 35% AB/65% MeAB (mass %) eutectic and of the 35% AB/65% MeAB (mass %) eutectic dissolved in methanol are given in Table 3. The data for the 35% AB/65% MeAB (mass %) solid eutectic was determined using a bomb calorimeter. The 35% AB/65% MeAB (mass %) methanol solution heat of combustion was calculated using the experimental bomb calorimeter data for the 35% AB/65% MeAB (mass %) solid eutectic and literature for the methanol heat of combustion. The results show that the 35% AB/65% MeAB (mass %) solid eutectic or the eutectic in solution are very high energy dense materials on a per mass basis or per volume basis.

TABLE 3

Heat of combustion for 35% AB/65% MeAB (mass %) mixtures

| Chemical | Method | $\Delta H_{comb}$ (kcal/g) | $\Delta H_{comb}$ (kcal/L) |
|---|---|---|---|
| 35% AB/65% MeAB (s) | Bomb Calorimeter | −10.4 | −7294.5 |
| 35% AB/65% MeAB Methanol Solution | Estimated Experiment, Literature | −9.4 | −6554.7 |

The materials and methods of the appended claims are not limited in scope by the specific materials and methods described herein, which are intended as illustrations of a few aspects of the claims and any materials and methods that are functionally equivalent are within the scope of this disclosure. Various modifications of the materials and methods in addition to those shown and described herein are intended to fall within the scope of the appended claims. Further, while only certain representative materials, methods, and aspects of these materials and methods are specifically described, other materials and methods and combinations of various features of the materials and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A fuel comprising:
a polar organic solvent, and
a hydrogen carrier dissolved in the solvent and present in an amount of at least 60% by weight, based on the weight of the fuel,
wherein the hydrogen carrier comprises ammonia borane and an alkylamine borane of the formula (I), $R^1R^2HN\text{—}BHR^3R^4$      (I), wherein $R^1$, $R^2$, $R^3$ and $R^4$ are each independently selected from hydrogen, substituted or unsubstituted $C_{1-10}$ alkyl, substituted or unsubstituted $C_{2-10}$ alkenyl, or substituted or unsubstituted $C_{6-14}$ aryl, or any two of $R^1$, $R^2$, $R^3$ and $R^4$ are linked to form a $C_{2-10}$ alkylene, which together with the nitrogen and/or boron atoms to which they are attached, forms a ring; and
wherein the fuel is a liquid at 5° C. or greater.

2. The fuel of claim 1, wherein the alkylamine borane comprises a $C_{1-6}$ alkylamine borane or a $C_{1-6}$ alkylenediamine bisborane.

3. The fuel of claim 1, wherein the weight ratio of ammonia borane to alkylamine borane in the hydrogen carrier is from 1:9 to 9:1.

4. The fuel of claim 1, wherein the hydrogen carrier is present in an amount of from 60% to 85% by weight, based on the weight of the fuel.

5. The fuel of claim 1, wherein the polar organic solvent is selected from the group consisting of an alcohol, a nitrile, a sulfoxide, and combinations thereof.

6. The fuel of claim 1, having a hydrogen density of at least 0.12 g/mL.

7. The fuel of claim 1, wherein:
the hydrogen carrier dissolved in the solvent is present in an amount of at least 75% by weight, based on the weight of the fuel, and
wherein the fuel is a liquid at 25° C. or greater.

8. The fuel of claim 7, wherein the hydrogen carrier is present in an amount of at least 85% by weight, based on the weight of the fuel.

9. The fuel of claim 1, wherein the polar organic solvent is selected from the group consisting of methanol, ethanol, 1-propanol, 2-propanol, 1-butanol, 2-butanol, acetonitrile, dimethyl sulfoxide, and combinations thereof.

10. The fuel of claim 1 wherein the fuel is hypergolic in the presence of an acidic oxidizing agent.

11. The fuel of claim 1, wherein the weight ratio of ammonia borane to alkylamine borane in the hydrogen carrier is from 1:9 to 1:1.

12. The fuel of claim 1, wherein the weight ratio of ammonia borane to alkylamine borane in the hydrogen carrier is from 1:4 to 2:3.

13. The fuel of claim 1, wherein the weight ratio of ammonia borane to alkylamine borane is 3:7.

14. A method of use of the fuel of claim 1, the method comprising contacting the fuel with an ignition source, thereby igniting and combusting the fuel.

15. The method of claim 14, wherein the ignition source is selected from the group consisting of an acidic oxidizing agent, a flame, a spark, and combinations thereof.

16. The method of claim 14, wherein the ignition source is an acidic oxidizing agent.

17. The method of claim 14, wherein the fuel has having a hydrogen density of at least 0.12 g/mL.

18. The method of claim 16, wherein the acidic oxidizing agent includes nitric acid.

19. The method of claim 14, wherein the fuel is hypergolic in the presence of an acidic oxidizing agent, and wherein the fuel and the acidic oxidizing agent are separate prior to use.

20. A method of combusting a fuel, the method comprising contacting the fuel with an ignition source to ignite and combust the fuel, wherein the fuel comprises:
a polar organic solvent, and
a hydrogen carrier at least partially dissolved in the solvent and present in an amount of at least 60% by weight, based on the weight of the fuel,
wherein the hydrogen carrier comprises ammonia borane and an alkylamine borane of the formula (I), $$R^1R^2HN\text{---}BHR^3R^4 \qquad (I),$$

wherein $R^1$, $R^2$, $R^3$ and $R^4$ are each independently selected from hydrogen, substituted or unsubstituted $C_{1-10}$ alkyl, substituted or unsubstituted $C_{2-10}$ alkenyl, or substituted or unsubstituted $C_{6-14}$ aryl, or any two of $R^1$, $R^2$, $R^3$ and $R^4$ are linked to form a $C_{2-10}$ alkylene, which together with the nitrogen and/or boron atoms to which they are attached, forms a ring.

21. The method hydrogen generation system of claim 20, wherein the alkylamine borane comprises a $C_{1-6}$ alkylamine borane or a $C_{1-6}$ alkylenediamine bisborane.

22. The method of claim 20, wherein the alkylamine borane is selected from the group consisting of methylamine borane, dimethylamine borane, ethylamine borane, propylamine borane, butylamine borane, pentylamine borane, hexylamine borane, methylenediamine bisborane, ethylenediamine bisborane, and mixtures thereof.

23. The method of claim 20, wherein the weight ratio of ammonia borane to alkylamine borane in the hydrogen carrier is from 1:9 to 9:1.

24. The method of claim 1, wherein the polar organic solvent is selected from the group consisting of an alcohol, a nitrile, a sulfoxide, and combinations thereof.

* * * * *

UNITED STATES PATENT AND TRADEMARK OFFICE
CERTIFICATE OF CORRECTION

| | | |
|---|---|---|
| PATENT NO. | : 11,485,633 B2 | Page 1 of 1 |
| APPLICATION NO. | : 16/377737 | |
| DATED | : November 1, 2022 | |
| INVENTOR(S) | : David A. Dixon et al. | |

It is certified that error appears in the above-identified patent and that said Letters Patent is hereby corrected as shown below:

In the Claims

In Column 21, Lines 27-28 of Claim 17, the text, "...wherein the fuel has having a hydrogen..." should read, --wherein the fuel has a hydrogen--

In Column 22, Line 18 of Claim 21, the text, "The method hydrogen generation system of..." should read, --The method of--

Signed and Sealed this
Tenth Day of January, 2023

Katherine Kelly Vidal
*Director of the United States Patent and Trademark Office*